Aug. 14, 1956  G. F. JENKINS  2,758,791
PLURAL ZONE TEMPERATURE CONTROL APPARATUS
Filed March 1, 1955

INVENTOR.
GEORGE F. JENKINS
BY Joseph E. Ryan
ATTORNEY

United States Patent Office 2,758,791
Patented Aug. 14, 1956

2,758,791

PLURAL ZONE TEMPERATURE CONTROL APPARATUS

George F. Jenkins, Minneapolis, Minn., assignor to Minneapolis-Honeywell Regulator Company, Minneapolis, Minn., a corporation of Delaware Application March 1, 1955, Serial No. 491,268

5 Claims. (Cl. 236—9)

This invention relates to an improved temperature control system for a plurality of zones, in particular, in a heating installation having a furnace for delivering a quantity of heated medium to each zone in which the temperature of the air furnished by the furnace is controlled in response to the outdoor temperature, the total quantity of air delivered to all of the zones this being a function of the damper position in the ducts leading to each zone, and the total heat load of the dwelling which is proportional to the total operating time of the heat source or burner.

The desirability of separating a home or dwelling into zones to provide for temperature control in each zone independent of the other zones is greatly increasing especially with the trend in home building of the construction of single floor homes commonly known as ramblers. To use a single thermostat it is difficult to proportion the delivery of heated air from a furnace to the widely spread rooms and maintain the temperature in all of the rooms within the limits of comfort. While such zone control systems have been available for some time there has been a need for an inexpensive and simple control system for controlling multizone heating installations in small dwellings.

In the copending application of Hubert T. Sparrow, Serial No. 414,659 filed March 8, 1954, a control apparatus is shown for controlling the temperature of a furnace used in a multizone system. The burner of the furnace is controlled by a switch having an actuator with a plurality of bulbs connected thereto. One of the bulbs being responsive to outdoor temperature and another being placed inside the furnace so that the temperature of the furnace is scheduled by outdoor temperature. There is provided a means for modifying the schedule of the furnace temperature by the position of the zone duct dampers this being indicative of the total quantity of air delivered by the furnace to all of the zones. Thus as the zone dampers open up, assuming that the outdoor temperature remains the same the furnace temperature will increase.

In a second copending application of Edward E. W. Martinson Serial No. 466,580 filed November 3, 1954, an improved control apparatus is shown for controlling the temperature of a furnace used in a multizone system. The furnace is controlled to maintain the furnace temperature in accordance with a predetermined schedule with outdoor temperature by a controller having a plurality of bulbs similar to that of the aforementioned copending application. This predetermined schedule is modified not only by the position of the dampers in the ducts leading to the zones and thus the total quantity of air delivered from the furnace to the zones but also the total operating time of the furnace heat source such being indicative of the heating load. This improvement increases the stability of the system.

The present invention is an improvement in the control apparatus disclosed in the aforementioned applications and increases the flexibility and operating range of the maintained furnace temperature. In particular, the temperature of the furnace is maintained by a burner or heat source controller having a plurality of bulbs, a first responsive to outdoor temperature and a second responsive to the furnace temperature. A third bulb has a center tapped heater thereon. A voltage is applied to a first section of the heater proportional to the position of the dampers in the ducts leading to the zones. This voltage is indicative of the total quantity of air delivered to the zones by the furnace. A voltage is applied to the second section of the heater proportional to the total operating time of the heat source this voltage being indicative of the heat load required by the dwelling and provides heat anticipation for stabilization of the system. Such an arrangement provides for a reset of the furnace temperature depending upon the total quantity of air delivered by the furnace to the zones and the heating load, independently. A wide range in the variation in the furnace temperature is provided and heat anticipation is added, these adding to the flexibility and adequacy of performance of the control apparatus.

It is therefore an object of the present invention to provide an improved temperature control system for a multizone installation.

It is another object of the present invention to provide an improved condition control system in which a condition changing means is scheduled independently by the quantity of condition medium supplied by the condition changing means and the total load of the condition changing means.

Another object of the present invention is to provide an improved, inexpensive and simple control system for a multizone heating installation wherein the operation of the heat furnishing means is scheduled proportional to the combined effects of outdoor temperature, the total quantity of heated medium delivered by the heat furnishing means, and the period of operation of the heat source.

These and other objects will become apparent upon a study of the following specification and drawing of which:

Figure 1:
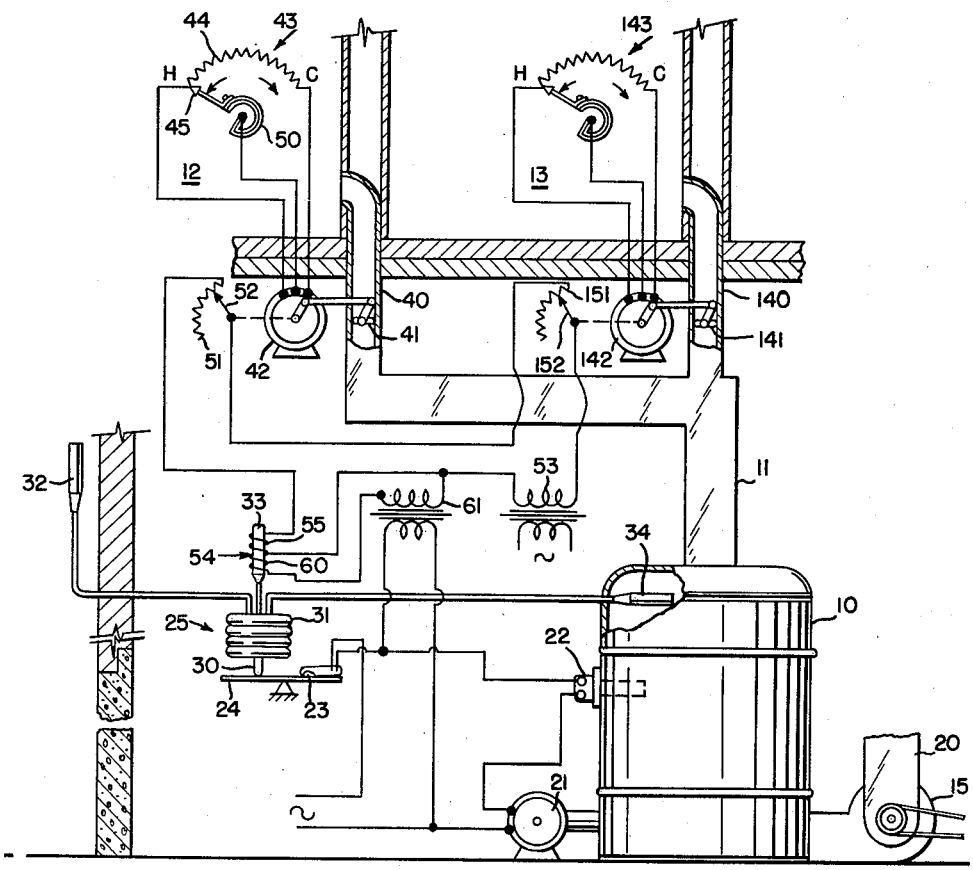
Figure 1 is a schematic showing of a multizone heating installation in which a forced air furnace delivers air through a plurality of ducts to associated zones; the burner being controlled by a switch responsive to outdoor temperature, the combined position of all of the dampers in the ducts, and the operating time of the burner.

Referring to Figure 1 a furnace or air conditioning device 10 is shown for delivering a quantity of heated medium, in this case being air, through a duct 11 to a plurality of zones two of which are indicated as 12 and 13. A fan 15 which is driven by a conventional motor (not shown) pulls the air from the zones through a return duct 20 and forces it into the furnace and again into the zones through duct 11. A burner 21 of a conventional type supplies heat to the furnace. The burner is connected to a source of power through a conventional limit controller 22 and a switch 23. Energization of the burner depends upon switch 23 however should the temperature in the furnace become excessive controller 22 acts as a high limit and would shut down the burner.

Switch 23 is shown as a conventional mercury tube type and is attached to a pivotally supported lever 24. An actuator 25 has an output member 30 which engages lever 24 on the opposite side of the pivot point from switch 23. When member 30 is moved downward switch 23 is tilted counterclockwise to open the switch and thus de-energizes burner 21. Member 30 of the actuator is moved by a bellows assembly 31 having a plurality of bulbs 32, 33 and 34 connected thereto in a closed liquid filled system. Upon the expansion of the liquid in the bulbs and thus an increase in the liquid pressure the bellows assembly moves member 30 downward to open the switch. Bulb 32 is mounted outside of the building and is responsive to outdoor temperature. Bulb 34 is mounted in the plenum or bonnet of the furnace and is responsive to the temperature of the air delivered through duct 11 to the zones. Neglecting the effect of the third bulb 33 it is obvious that a predetermined furnace temperature is maintained for every outdoor temperature depending upon the calibration of actuator 25 in a manner not shown.

Zone 12 receives air through a duct 40 connected to duct 11. Duct 40 contains a damper 41 positioned through an appropriate linkage by a motor 42. Motor 42 is controlled by a room thermostat 43 located in the zone 12. The thermostat comprises a resistance element 44 across which a wiper 45 is positioned by a bimetal element 50 depending upon the room temperature. This potentiometer is connected to the motor so that the predetermined position of the output arm of the motor exists for every position of the wiper 45 as it travels across resistor 44. The motor and thermostat are of a sort as disclosed in Patent 2,028,110 granted to Daniel G. Taylor on January 14, 1936. As shown the thermostat is satisfied and as the room temperature decreases the wiper 45 moves clockwise across resistor 44 and at the same time motor 42 opens damper 41 until at its full open position wiper 45 is to the far right extreme on resistor 44.

It is obvious that a number of zones might be used and that only two are shown for illustrative purposes. The components of the thermostat and motor of zone 13 are identified by numbers used in zone 12 increased by one hundred.

A potentiometer comprising a resistor 51 and a wiper 52 positioned by motor 42 has the wiper located at the upper end of the resistor when the damper 41 is closed. As the motor opens damper wiper 52 moves downward to the other end of the resistor. A similar potentiometer exists in zone 13. These aforementioned potentiometers are connected in series with a secondary winding 53 of a source of power to one section 55 of a resistance heater winding 54 wrapped around bulb 33. A second section 60 of the resistance winding is connected to a secondary of a transformer 61 whose primary is connected on the control side of switch 23. The time constant of heater 55 is selected for a particular speed of the damper motors 42 and 142. Should the motors be fast operating heater 55 should have a rather long time constant so that actuator 25 only responds to the average of the cyclic movement of dampers 41 and 141. Whenever motors 42 and 142 have closed dampers 41 and 141 wipers 52 and 152, respectively, are at the upper extremities of their respective resistors thus reducing the resistance in the series circuit traced from the secondary 53, wiper 152, the upper end of resistor 151, wiper 52, the upper end of resistor 51, the first section 55 of heater 54 and back to secondary 53.

As shown in Figure 1 with the dampers closed and wipers 52 and 152 at the upper extremities of their respective resistors a maximum voltage is applied to the section 55 of heater 54 which increases the temperature of the fluid therein thereby expanding the bellows assembly 31. This modifies the relation between the bulbs 32 and 34 or the relation between the outdoor temperature and the maintained furnace temperature as established by switch 23. In this particular case the maintained furnace temperature is lowered for the same outdoor temperature. As wiper 52 or 152 or both move downward on their respective resistors upon a call for heat by the thermostats 43 or 143 the resistance in the heater circuit increases so that the maintained furnace temperature increases for the same outdoor temperature. It is seen that the damper position and thus the amount of air delivered to the zones is one factor in scheduling the relation of outdoor temperature to maintain furnace temperature.

Whenever the burner is energized by switch 23 a voltage is applied by secondary 61 to the lower section 60 of the heater. The amount of operation of the burner is proportional to the heating load which is a function of outdoor weather conditions. As the heating load changes the schedule of furnace temperature as maintained by the outdoor temperature is modified by reducing the furnace temperature as the heating load increases.

Figure 2:
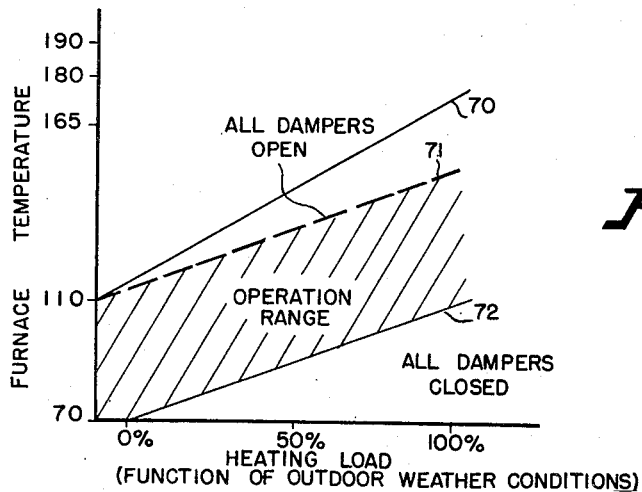
Figure 2 is a graphical representation of a particular operating schedule of the maintained furnace temperature for various damper positions and heating loads.

Referring to Figure 2 showing the graphical representation of the operating schedule plotted as a function of furnace temperature versus heating load. This is for illustrative purposes only and represents only one typical installation. The heating load is a function of the outdoor weather conditions which effects the amounts of heat needed to keep the dwelling at the desired temperature. The sloped line 70 is an illustrative example of a plot of furnace temperature at various heating loads with no heat being applied to bulb 33 by the heater 54. A characteristic represented by line 70 is determined by the calibration of actuator 25 by means not shown. The sloped line 71 diverging from line 70 is the operating line obtained upon considering only the lower section 60 of the heater which is energized when the burner operates. The reduction in furnace temperature represented by line 71 from that of line 70 is obtained by the heat anticipation and is commonly known as "droop." It is obvious as the heating load increases and the per cent operating time of the burner increases a greater amount of droop is obtained. The maintained furnace temperature drops as the bulb 33 receives more frequent surges of heat from heater 54. Line 72 which is substantially parallel to line 71 indicates the furnace temperature schedule obtained with all dampers closed and a maximum amount of heat being applied to heater 54. It is thus obvious that as the required amount of air to the zones is cut down the furnace temperature is also depressed. The "operating range" or the range of temperature maintained in the furnace at various heating loads is shown between lines 71 and 72.

*Operation*

As shown in Figure 1 the zones are satisfied and a maximum amount of heat is applied to bulb 33 by section 55 of heater 54 so that the maintained furnace temperature is quite low. For illustrative purposes it might be said that it is at a point along line 72 depending upon the outdoor temperature. Upon a call for heat in any one of the zones, for example in zone 12 wiper 45 moves clockwise across resistor 44 to open damper 41. At the same time wiper 52 moves downward on resistor 51 to increase the resistance in the circuit of section 55 of the heater on bulb 33 to reduce the amount of heat applied to the bulb. This modifies the relation between bulbs 32 and 34 to increase the maintained furnace temperature and the operating point now would be above line 72 in Figure 2 in the "operating range." It is thus seen that as the demand for air to the zones increases the temperature of the air increases and indirectly the thermostats are effective to cause the burner to operate more often to increase the furnace temperature. With a proper matching of the time constant of heater 55 to motors 42 and 142 only the average position of dampers 41 and 141 and thus the average total air flow to the zones is effective upon the modification of the relation between outdoor temperature and maintained furnace temperature. At the same time that the burner is energized heat is applied to section 60 of the heater 54 to produce a droop on the temperature maintained in the furnace for that particular outdoor temperature. This provides for stability in the system and tends to decrease the amount of overshoot by more adequately matching furnace to the heating load. With all of the zones calling for heat and the dampers fully open the maintained furnace temperature would be at the upper limit of the operating range. In Figure 2, it is seen that this maximum limit is established at line 71 as heat is applied to the bulb 33 by section 60 of the heater depending upon the total time of operation of the burner.

Such a system provides for a wide operating range and yet stability is maintained in the system. It is desired that the maintained furnace temperature can vary greatly between some low limit and some upper limit at various heating loads depending upon the need for heat in the various zones. With such an arrangement this operating range is wide which allows the control system to match the furnace output more closely to the load required at that present time by the zones and this matching increases the adequacy of the control system thereby maintaining the temperature in the zones close to the desired temperature. At the same time heat anticipation is introduced into the system for stabilization.

While the invention has been disclosed with a forced air heating installation it is obvious that other types of conditioning changing means might be controlled with this sort of system, thus it is intended that the invention only be limited by the scope of the appended claims, in which

I claim:

1. In temperature control apparatus for controlling the operation of a heat furnishing device which supplies a quantity of heated medium through conduits to a plurality of spaces; temperature responsive means associated with each space responsive to the temperature therein; flow control means associated with each conduit for controlling the flow of medium to its respective space; connection means connecting each of said temperature responsive means in controlling relation to its respective flow control means; actuator means for controlling the heat furnishing device, said actuator having a plurality of bulbs connected in a closed system thereto, a first of said bulbs being responsive to outdoor temperature, a second of said bulbs being responsive to the output temperature of the heat furnishing device, and a third bulb, said actuator means scheduling the output temperature of the heat furnishing device in accordance with outdoor temperature; first and second heater means associated with said third bulb each of which being adapted to adjust the output temperature schedule of said heat furnishing device as it relates to outdoor temperature; means associated with each of said flow control means for energizing said first heater in accordance with the total flow of heated medium to all spaces so that upon an increase in total flow the output temperature of said heat furnishing device is increased; and means for energizing said second heater in accordance with the amount of operation of the heat furnishing device so that upon an increase in the heating load a droop in the output temperature of the heat furnishing device is provided.

2. In apparatus for controlling the operation of a heat furnishing device which supplies a quantity of heated medium through a plurality of conduits to a plurality of spaces each of said conduits having a flow control device; temperature responsive means associated with each of the spaces responsive to the temperature therein; a plurality of motor means each of which is adapted to control its respective flow control device; connection means connecting said temperature responsive means in controlling relation to said motor means for affecting the flow of heated medium to its particular space; control means adapted to control the heat furnishing device to maintain the heated medium at a selected temperature; means associated with each of said motor means for independently modifying said control means depending on the total flow of medium to the spaces to gradually reduce the temperature of the medium of said heat furnishing device as said total flow decreases; and further means associated with said control means for further modifying said control means depending upon the per cent of operating time of the heat furnishing device to reduce the temperature of the medium of said heat furnishing device as the total operating time of said device increases.

3. In apparatus for controlling the operation of a condition changing device which supplies a quantity of conditioned medium through a plurality of conduits to a plurality of spaces, each of the conduits having a flow control device; condition responsive means associated with each of the spaces; motor means adapted to adjust each of the flow control devices; connection means connecting each of said condition responsive means to control its associated motor means; control means adapted to control the operation of the condition changing device; first means associated with said flow control devices responsive to the total quantity of medium supplied to all spaces for independently adjusting said control means to lower the output of said changing device as said quantity of medium decreases; and further means responsive to the per cent of total on time of the condition changing means for further adjusting said control means to lower said output as said on time increases.

4. In control apparatus, condition changing means for supplying a quantity of conditioned medium to a space through an associated conduit connecting said condition changing means and said space, condition responsive means for the space, control means for the conduit for controlling the flow of medium therethrough, means connecting said condition responsive means in controlling relation to said control means, second control means for controlling the output of said condition changing means, first means associated with said first mentioned control means responsive to the total quantity of medium delivered to the space for modifying the effect of said second control means thereby gradually decreasing said output as said quantity decreases, and second means associated with said second control means, said second means being responsive to the total time of operation of said condition changing means for modifying the effect of said second control means thereby decreasing said output as said time increases.

5. In temperature control apparatus for controlling the operation of an air conditioning device for supplying a quantity of conditioned air through ducts to a plurality of zones; temperature responsive means for each of the zones; flow control means associated with the ducts for controlling the flow of conditioned air to each of said zones, said flow control means being controlled by said temperature responsive means of the associated zone; control means for controlling the temperature of the air being supplied to said zones by the air conditioning device, said control means having first means responsive to outdoor temperature and second means responsive to the temperature of the air in said conditioning device, further means associated with said flow control means to modify the effect of said first and second means on said control means in response to the total quantity of air delivered to all zones so that the temperature of air from said device increases as said total quantity increases, and still further means associated with said control means to modify the effect of said first and second means on said control means in response to the total amount of operation of air conditioning device so that a lower air temperature is obtained from said device as said amount of operation increases.

References Cited in the file of this patent

UNITED STATES PATENTS

| 1,826,100 | Stewart | Oct. 6, 1931 |
| 2,584,445 | Hajek | Feb. 5, 1952 |